Aug. 1, 1933.  P. M. BOURDON  1,920,350
DEVICE FOR MOUNTING WHEELS ON HUBS
Filed Dec. 27, 1932  2 Sheets-Sheet 2

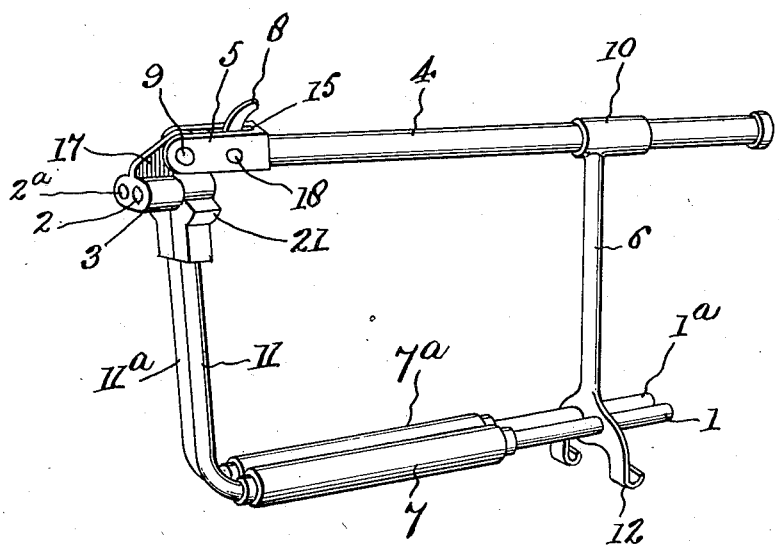
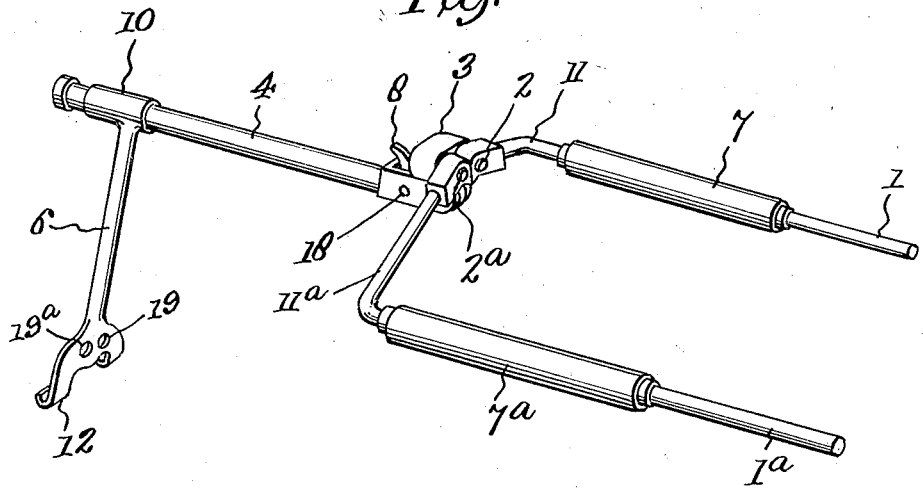

Inventor
Pierre Marcel Bourdon
By
Wilkinson & Mawhinney
Attorneys.

Patented Aug. 1, 1933

1,920,350

UNITED STATES PATENT OFFICE 1,920,350

DEVICE FOR MOUNTING WHEELS ON HUBS

Pierre Marcel Bourdon, Paris, France, assignor to Michelin et Cie, Clermont-Ferrand, France, a Corporation of France Application December 27, 1932, Serial No. 649,061, and in France January 6, 1932

5 Claims. (Cl. 254—131)

The present invention relates to improvements in devices for mounting wheels on hubs, and has for an object to provide an improved device both for mounting and demounting vehicle wheels, particularly where heavily weighted wheels are involved, the wheels being difficult to mount and demount on account of their great weight and dimensions.

It is another object of the invention to provide a mounting device of small overall dimensions, of small weight and useful in the mounting and demounting of wheels with a minimum of effort and a maximum speed.

A further object of the invention resides in providing an improved device which enables the raising and centering of the wheel in such way that the openings in the wheel will come opposite the bolts or pins on the hub.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of the device in a folded position.

Figure 2 is a similar view of the device ready for use.

Figure 4:
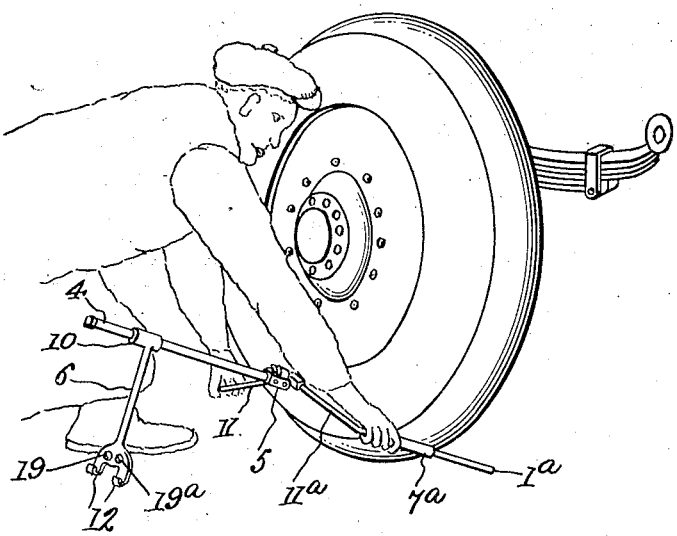
Figure 4 is a perspective view of the device as applied to a tire in the act of mounting the same.

Referring more particularly to the drawings the general arrangement of the device resembles a fork, of which the handle is indicated at 4, and the two tine or branch members are represented at 1 and $1^a$. The branch members are provided with rollers 7 and $7^a$ which are spaced from the terminal ends of the members 1 and $1^a$. Such members 1 and $1^a$ are supported upon elbows 11 and $11^a$, the elbows being pivoted to a head 3 by means of the pivot pins 2 and $2^a$. The head 3 is pivoted to one end portion of the handle as indicated by the cross pivot 9. The elbows 11 and $11^a$ support the branch members 1 and $1^a$ in parallelism with the handle 4 but in a lower plane, as indicated in Figures 2 and 4.

The handle carries at one end a head or shackle member 5 through which engages the pivot pin 9, around which the head 3 revolves carrying the branch members. Along the arm 4 slides a sleeve 10 carrying a crutch or supporting member 6 having the feet 12 for resting on the ground. In the arrangement shown, the feet are provided with openings 19 and $19^a$ into which are slidably thrust the ends of the branch members 1 and $1^a$ in the folded or collapsed position, shown in Figure 1, which is the carrying position.

Figure 3:
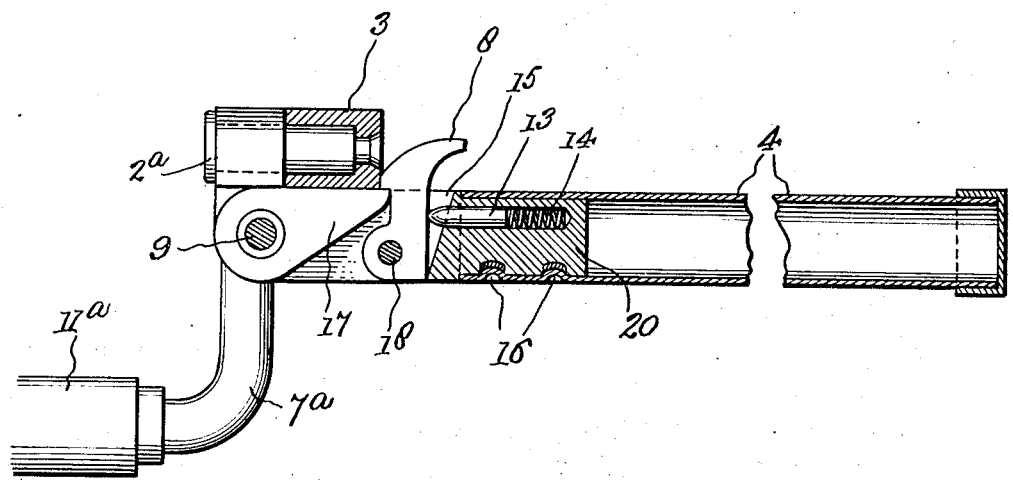
Figure 3 is a fragmentary sectional view taken through the joint of the device on an enlarged scale.

As shown in Figure 3, a pawl 8 is shown as pivoted at 18 and engaging over a shouldered part 17 on the head 3, such shouldered part and the pawl 8 having mutually inclined or curved surfaces for acting to move the pawl 8 back when the head 3 is swung toward the position shown in Figure 3. The pawl 8 pivots about a pin 18 mounted cross-wise of a recess 15 in the handle 4 or its shackle head. The pawl 8 is yieldably pushed outwardly by means of a pin 13 and spring 14 mounted in a socket in a plug or part 20 in the end portion of the handle 4. This plug 20 is maintained in the handle, which is shown as tubular, in any appropriate manner, for instance by the use of depressed portions 16 being caused to penetrate in the corresponding recesses provided in the plug 20. The elbows 11 and $11^a$ carry shoulders 21 for engaging against the side of the head 5 when the branch members 1 and $1^a$ are spread apart.

In the operation of the device, assuming the parts are in the folded position shown in Figure 1, the crutch or support 6 is slid along the handle 4 toward the right to disengage the ends of the branch members 1 and $1^a$ from the openings 19 and $19^a$. Then the head 3, carrying branch members 1 and $1^a$ is swung around the pivot 9 a distance of 180°, bringing it to the position shown in Figure 2. In this position the head 3 is locked by means of the pawl 8. The parts are thus maintained in the position shown in Figures 2 and 3. The branches 1 and $1^a$ are swung about their pivots 2 and $2^a$ in order to separate the same and bring them down until the shoulders $21^a$ engage the shackle head 5. This not only brings the branch members 1 and $1^a$ apart and into substantially the same plane but it also brings the same in a plane lower than the handle 4. The spreading distance of the branches 1 and $1^a$ is limited by the stops or shoulders 21.

In another aspect, beginning from Figure 1, the crutch member 6 may be first slid to the right to disengage the branch members 1 and $1^a$; then the handle 4 may be swung over on its pivot 9 through an arc of 180°. The pawl 8 will then lock the head 3 as heretofore. The device is then turned over to bring the feet 12 of the crutch member down and the branch members 1 and 1ª are spread out until the shoulders or stops 21 arrest the spreading movements. To demount a wheel, the branch members are placed beneath the tire, as indicated in Figure 4. One hand is placed on the handle 4 working or pulling up and down to lightly raise the wheel while the other hand, which is placed at the top of the tire, is used to work the wheel from off the bolts or pins. The wheel is then allowed to fall to the ground.

On the other hand to mount a wheel, the branch members 1 and 1ª are placed under the tire so that the rollers 7 and 7ª engage such tire at opposite sides of its center. Using the handle 4 as a lever by one hand the device is caused to move the tire up and down in such a way as to bring the openings in the wheel to the height of the bolts or pins of the hub. If the openings coincide with the bolts it will suffice to push the wheel onto the hub. If, however, the openings are not found to be in front of the pins or bolts, the wheel is maintained raised at the desired height by moving the crutch 6 along the handle 4 and allowing the rollers 7 and 7ª to turn in such a way that by rotation of the wheel the openings are placed in line with the bolts of the hub.

It is to be understood that the invention is not limited to the example shown and described but is susceptible of embodiment in various other mechanical forms.

What is claimed is:—

1. A device for the mounting and demounting of wheels of vehicles comprising a handle, branch members pivoted with respect to one another and to the handle, and a support slidable on the handle to interlock with the members.

2. A device for the mounting and demounting of wheels of vehicles comprising a handle, a head pivoted to the handle, branch members pivotally carried by the head, and a sliding support on the handle to interlock with the members.

3. A device for the mounting and demounting of wheels of vehicles comprising a handle, a head pivoted to the handle, latch means to hold the head in one position on the handle, elbows pivoted to the head and offset angularly from the handle, and branch members on the elbows.

4. A device for the mounting and demounting of wheels of vehicles comprising a handle, a head pivoted on the handle, a yieldable pawl on the head for interlocking with the head, branch members offset from the handle and pivoted in the head, and a crutch slidable on the handle and having openings to receive the ends of the members.

5. A device for the mounting and demounting of wheels of vehicles comprising a handle, a crutch having a sleeve slidable on the handle and feet with openings, and branch members pivoted to the handle and with respect to one another and adapted to slide into and out of said openings.

PIERRE MARCEL BOURDON.